United States Patent
Sasaki

(10) Patent No.: US 7,383,031 B2
(45) Date of Patent: Jun. 3, 2008

(54) RECEIVING CIRCUIT FOR RADIO-WAVE CLOCK BROADCAST WAVE

(75) Inventor: Fumihiro Sasaki, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 434 days.

(21) Appl. No.: 11/240,688

(22) Filed: Sep. 30, 2005

(65) Prior Publication Data
US 2006/0073799 A1 Apr. 6, 2006

(30) Foreign Application Priority Data
Oct. 1, 2004 (JP) .............................. 2004-290012

(51) Int. Cl.
*H04B 1/18* (2006.01)
(52) U.S. Cl. ................ 455/131; 455/181.1; 455/186.1; 368/47
(58) Field of Classification Search ...................... None
See application file for complete search history.

(56) References Cited

U.S. PATENT DOCUMENTS 5,991,240 A * 11/1999 Van Ryzin .................... 368/47
6,751,163 B1 * 6/2004 Miyakawa .................... 368/46
2006/0105703 A1 * 5/2006 Takizawa et al. ........... 455/3.01

FOREIGN PATENT DOCUMENTS

JP        2004-80073        3/2004

* cited by examiner

*Primary Examiner*—Thanh Cong Le
(74) *Attorney, Agent, or Firm*—SoCal IP Law Group LLP; Steven C. Sereboff

(57) ABSTRACT

A receiving circuit for a radio-wave clock broadcast wave having a frequency converter that converts a received signal of the radio-wave clock broadcast wave into a signal of a frequency in the bandwidth of an AM radio broadcast. The converted-into signal is input to a first high frequency amplifier of an AM radio receiver of a heterodyne type comprising the amplifier, an oscillator, a frequency mixer generating a signal of an intermediate frequency, an intermediate frequency amplifier amplifying the signal of the intermediate frequency, and a detector. Time correction is performed on the basis of a demodulated signal of the radio-wave clock broadcast wave output from the detector.

25 Claims, 5 Drawing Sheets

RECEIVING CIRCUIT FOR RADIO-WAVE CLOCK BROADCAST WAVE

CROSS-REFERENCE TO RELATED APPLICATIONS

The present application claims priority from Japanese Patent Application No. 2004-290012 filed on Oct. 1, 2004. which is herein incorporated by reference.

BACKGROUND OF THE INVENTION

1. Field of the Invention

The present invention relates to a receiving circuit for a radio-wave clock broadcast wave and particularly to technology for realizing the mechanism of a radio-wave clock to be small in size, easy to mount and inexpensive.

2. Description of the Related Art

These days, many of products such as radios, car audio systems, and home audio systems have a clock function. Most of clock circuits mounted in these products use a crystal oscillator. With the circuits using a crystal oscillator, there is a limit in improving their accuracy because variation of about ±1 to ±5 sec per day and thus variation of about ±30 to ±150 sec per month occur.

One method to improve accuracy is to adopt a radio-wave clock. However, in order to realize a radio-wave clock, a circuit to receive a reference wave of 40 kHz to 80 kHz in frequency is necessary (refer to, for example, Japanese Patent Application Laid-Open Publication No. 2004-80073), and in order to incorporate this in the above products, the tasks of reducing its size and costs need to be achieved.

SUMMARY OF THE INVENTION

The present invention was made in view of the above tasks. An object of the invention is to provide a receiving circuit for a radio-wave clock broadcast wave that can be realized as being small, easy to mount, and inexpensive.

A main aspect of the present invention to achieve the above object is a receiving circuit for a radio-wave clock broadcast wave comprising a receiver for an AM radio broadcast wave which comprises a first high frequency amplifier that amplifies a received signal of the AM radio broadcast wave, an oscillator, a frequency mixer that mixes a signal output from the first high frequency amplifier with an oscillating signal of a first frequency generated by the oscillator thereby generating a signal of an intermediate frequency, an intermediate frequency amplifier that amplifies the signal of the intermediate frequency, and a detector that demodulates a signal output from the intermediate frequency amplifier; a second high frequency amplifier that amplifies a received signal of the radio-wave clock broadcast wave; a frequency converter that mixes a-signal output from the second high frequency amplifier with an oscillating signal of a third frequency thereby converting into a signal of a frequency in a bandwidth of the AM radio broadcast wave; and a control circuit that makes the signal of the frequency in the AM radio broadcast wave bandwidth converted into by the frequency converter be input to the first high frequency amplifier and supplies a demodulated signal of the radio-wave clock broadcast wave that is output from the detector to a circuit performing time correction on the basis of the demodulated signal.

The receiving circuit for the radio-wave clock broadcast wave of the present invention receives the radio-wave clock broadcast wave and demodulates its signal by use of the first high frequency amplifier, the oscillator, the frequency mixer, a band pass filter (BPF), the intermediate frequency amplifier, the detector, and the like which form the AM radio broadcast wave receiving circuit. Hence, the receiving circuit for the radio-wave clock broadcast wave can be realized as being small, easy to mount, and inexpensive, and can be easily incorporated in a radio, a car audio system, a home audio system, and the like.

According to the invention, the mechanism of the radio-wave clock can be realized as being small, easy to mount, and inexpensive.

Features and objects of the present invention other than the above will become apparent from the description of this specification and the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

Figure 1:
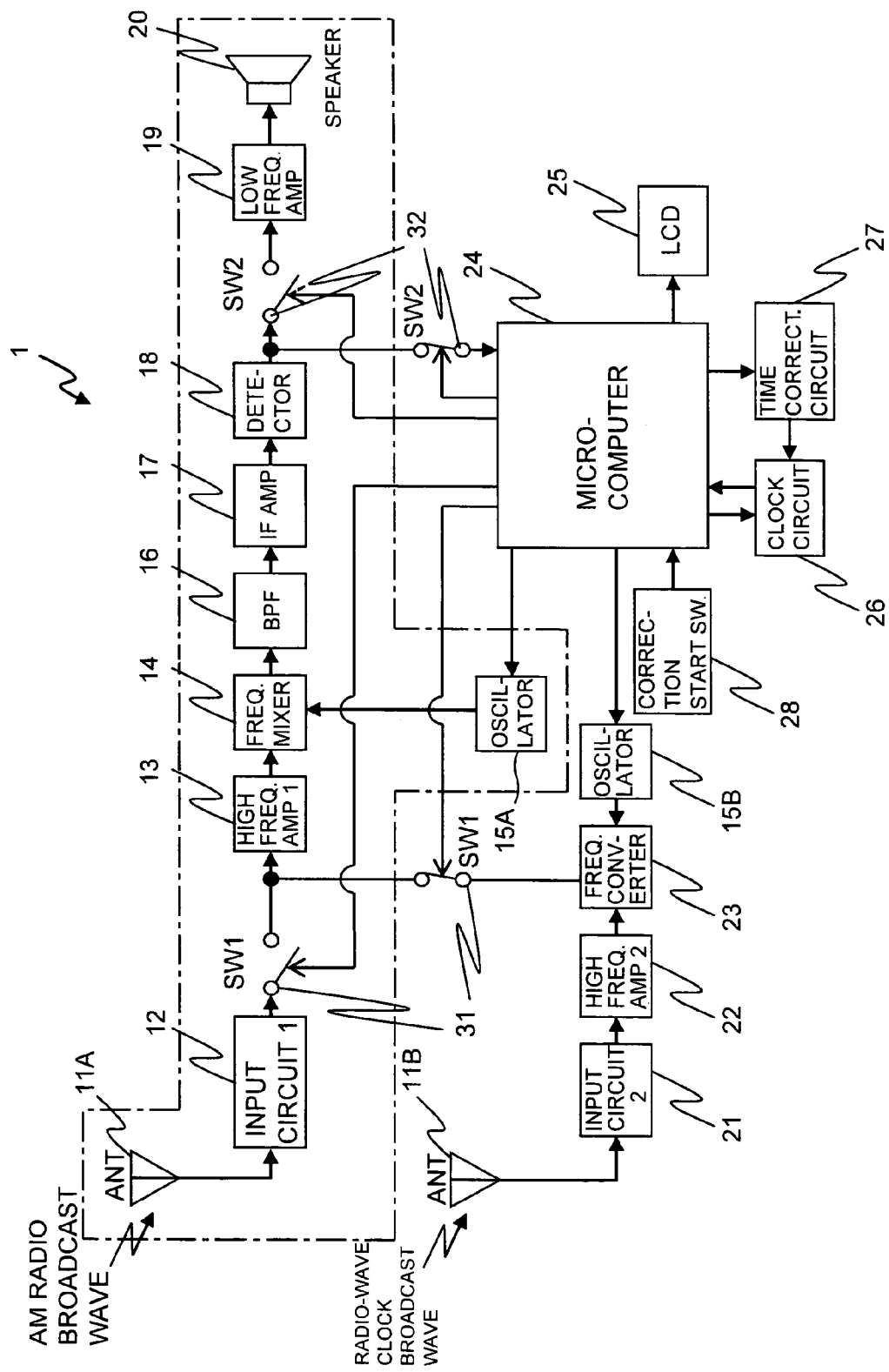
FIG. 1 is a diagram showing the block configuration of a receiving circuit 1 for a radio-wave clock broadcast wave using a receiver of a single super heterodyne type, described as an embodiment of the present invention.

An embodiment of the present invention will be described with reference to the drawings. FIG. 1 shows a receiving circuit 1, which will be explained as the embodiment of the present invention. The receiving circuit 1 can reproduce AM radio broadcasts of about 500 kHz to 2000 kHz in frequency as well as implement the function of a radio-wave clock.

In FIG. 1, the function of reproducing AM radio broadcasts is realized by a single super heterodyne receiving circuit (hereinafter called a "receiver for an AM radio broadcast") comprising an antenna (ANT) 11a having a gain for the AM radio broadcast wave bandwidth of about 500 kHz to 2000 kHz, a first input circuit 12, a first high frequency amplifier 13, a frequency mixer 14, an oscillator 15a. a band pass filter (BPF) 16, an intermediate frequency amplifier 17, a detector 18, a low frequency amplifier 19, and a speaker 20. The signals of AM radio broadcast waves are received by the antenna (ANT) 11a and converted into electrical signals, which are inputted to the first input circuit 12 including an impedance matching circuit and a tuning circuit. A signal of a desired frequency selected by the tuning circuit is amplified by the first high frequency amplifier 13 and inputted to the frequency mixer 14. The frequency mixer 14 mixes the signal output from the first high frequency amplifier 13 with an oscillating signal of a first frequency generated by the oscillator 15a thereby producing a signal of an intermediate frequency.

The oscillator 15a is a circuit such as a crystal oscillator or a PLL frequency synthesizer, and produces the oscillating signal of a frequency specified by a microcomputer 20. In the case where the received signal of the AM radio broadcast wave has a frequency of 594 kHz and the intermediate frequency is 455 kHz, the first frequency is at 139 kHz=594 kHz−455 kHz.

The signal produced by the frequency mixer 14 goes through the band pass filter (BPF) 16 and is input to and amplified by the intermediate frequency amplifier (IF amplifier) 17. The signal amplified by the intermediate frequency amplifier 17 is input into and demodulated by the detector 18. The demodulated signal is input into and amplified by the low frequency amplifier 19, and then output to the speaker 20. By this means, an audio signal included in the AM radio broadcast wave is reproduced.

In contrast to the above AM radio broadcast reproducing function, the function as a radio-wave clock is realized by an antenna (ANT) 11b having a gain for the radio-wave broadcast wave bandwidth of about 40 kHz to 80 kHz, a second input circuit 21, a second high frequency amplifier 22, a frequency converter 23, an oscillator 15b. and a microcomputer 24 including a CPU as a control circuit performing various controls in the receiving circuit 1 for a radio-wave clock broadcast wave and memory, a liquid crystal display panel (LCD) 25 displaying time information and the like, a clock circuit 26 operating with a backup battery without a stop and generating current time on the basis of a reference frequency generated by a crystal oscillation circuit or the like, and a time correction circuit 27 correcting the current time generated by the clock circuit 26 on the basis of the received signal of the radio-wave clock broadcast wave.

The microcomputer 24 acquires the current time generated by the clock circuit 26 and displays the current time on the liquid crystal display panel (LCD) 25 in real time. Furthermore, the microcomputer 24 extracts current time from a demodulated signal of the radio-wave clock broadcast wave inputted by the detector 18, and corrects the time of the clock circuit 26.

The demodulated signal of the radio-wave clock broadcast wave is supplied to the microcomputer 24 in the following manner. The signal of the radio-wave clock broadcast wave is received and converted by the antenna (ANT) 11b into an electrical signal, and then input to the second input circuit 21 including the impedance matching circuit and the tuning circuit. A signal of a desired frequency selected by the second input circuit 21 is amplified by the second high frequency amplifier 22 and input to the frequency converter 23.

The oscillator 15b is a circuit such as a crystal oscillation circuit or a PLL frequency synthesizer, and produces the oscillating signal of a frequency specified by a microcomputer 20. By mixing an oscillating signal of a third frequency generated by the oscillator 15b. the frequency converter 23 converts a signal outputted from the second high frequency amplifier 22 into a signal of a frequency in the AM radio broadcast wave bandwidth. Here, in the case where the received signal of the radio-wave clock broadcast wave has a frequency of 40 kHz and is converted into a signal having a frequency of 530 kHz in the AM radio broadcast wave bandwidth, the third frequency is at 490 kHz=530 kHz−40 kHz.

The signal of the frequency in the AM radio broadcast wave bandwidth converted into by the frequency converter 23 is input to the first high frequency amplifier 13 and then goes through the frequency mixer 14, the band pass filter (BPF) 16, the intermediate frequency amplifier 17, and the detector 18 to be demodulated. The demodulated signal is supplied to the microcomputer 24. In this way, in the receiving circuit 1 of the present embodiment, part of the circuit realizing the AM radio broadcast reproducing function is used to demodulate the signal of the radio-wave clock broadcast wave.

The microcomputer 24 switches between the operating state for reproducing the AM radio broadcast (hereinafter called a "first operating mode") and the operating state for receiving the radio-wave clock broadcast wave and demodulating (hereinafter called a "second operating mode") as described above by controlling a first switch (SW1) 31 and a second switch (SW2) 32 as needed.

The first switch (SW1) 31 is provided on the input side of the first high frequency amplifier 13. The first switch (SW1) 31 selects either the received signal of the AM radio broadcast wave supplied by the first input circuit 12 or the received signal of the radio-wave clock broadcast wave supplied by the frequency converter 23 to be input to the first high frequency amplifier 13. Meanwhile, the second switch (SW2) 32 is provided on the output side of the detector 18, and selects either the low frequency amplifier 19 or the microcomputer 24 to have the output of the detector 18 inputted thereto.

Figure 2:
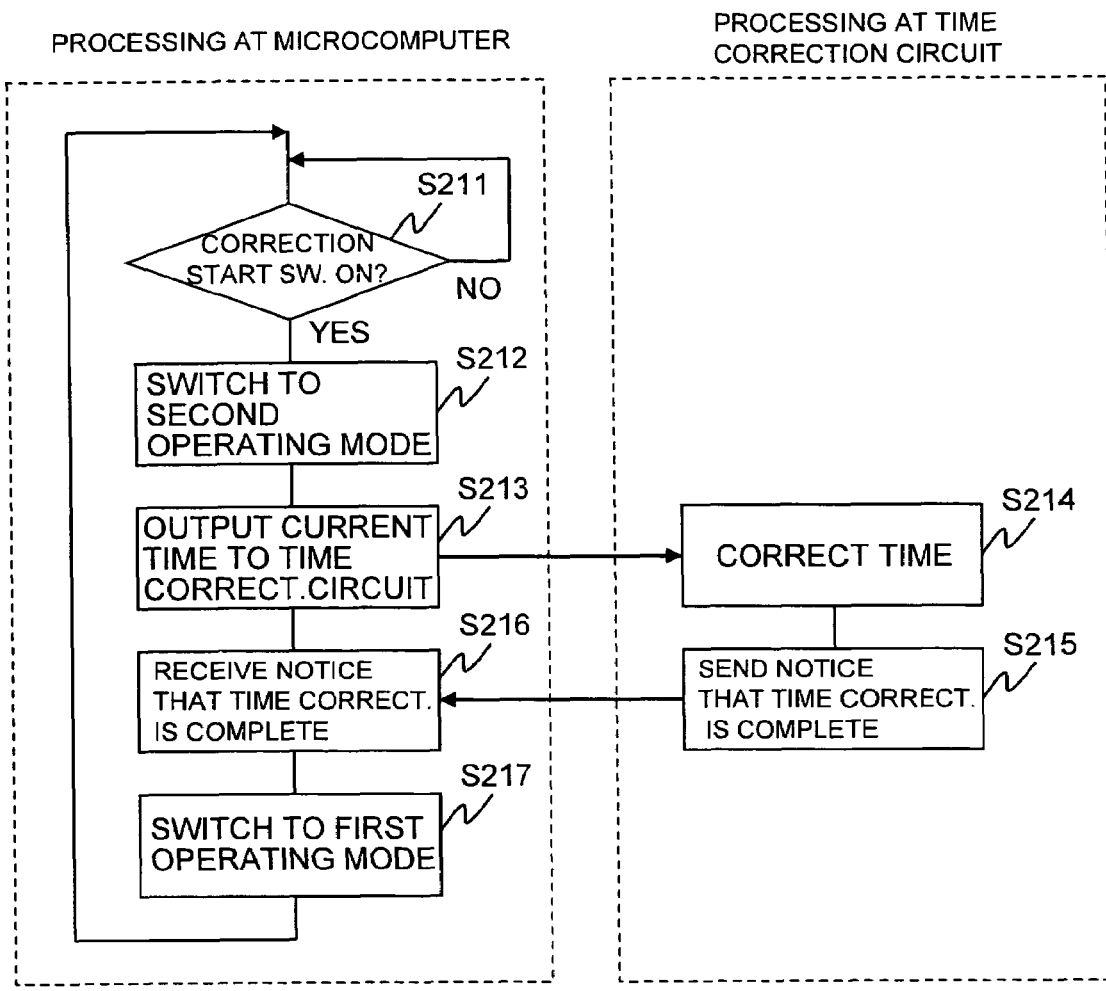
FIG. 2 is a flow chart explaining the operation related to time correction of the receiving circuit 1 for the radio-wave clock broadcast wave described as the embodiment of the present invention.

For example, when a correction start switch 28, i.e., a user interface provided in the receiving circuit 1 is operated to cause the start of time correction during the reproduction of the AM radio broadcast, the microcomputer 24 starts the process of time correction. The specific operation of the receiving circuit 1 for the radio-wave clock broadcast wave in the time correction will be described below with reference to the flow chart of FIG. 2.

The microcomputer 24 is monitoring the state of the correction start switch 28 in real time (step 211). When detecting the correction start switch 28 having been switched on, the microcomputer 24 controls the first switch (SW1) 31 and the second switch (SW2) 32 to switch to the second operating mode (step 212). Thus, only the received signal of the radio-wave clock broadcast wave supplied from the frequency converter 23 is input to the first high frequency amplifier 13, and the output of the detector 18 is supplied to only the microcomputer 24.

Next, the microcomputer 24 acquires accurate current time from the demodulated signal of the radio-wave clock broadcast wave input from the detector 18, and outputs the acquired current time to the time correction circuit 27 (step 213). The time correction circuit 27 corrects (or sets) the time of the clock circuit 26 on the basis of the accurate current time input from the microcomputer 24 (step 214). After the time correction (or setting) is complete, the time correction circuit 27 sends a notice to that effect to the microcomputer 24 (step 215).

The microcomputer 24 receives from the time correction circuit 27 the notice that the time correction (or setting) is completed (step 216), and then controls the first switch (SW1) 31 and the second switch (SW2) 32, thereby switching the operation mode of the receiving circuit 1 for the radio-wave clock broadcast wave to the first operating mode (step 217). Thus, only the received signal of the AM radio broadcast wave supplied from the first input circuit 12 is input to the first high frequency amplifier 13, and the output of the detector 18 is supplied to only the low frequency amplifier 19.

As described above, the receiving circuit 1 for the radio-wave clock broadcast wave according to the present embodiment receives the radio-wave clock broadcast wave by use of the first high frequency amplifier 13, the frequency mixer 14, the oscillator 15, the band pass filter (BPF) 16, the intermediate frequency amplifier 17, and the detector 18, which form the receiver for the AM radio broadcast wave. Hence, the radio-wave clock can be realized as being small, easy to mount, and inexpensive, and is easy to mount in a radio, a car audio system, a home audio system, and the like. Moreover, in the receiving circuit 1 for the radio-wave clock broadcast wave according to the present embodiment, the band pass filter (BPF) 16, which accounts for relatively large part of costs compared with other components, is shared by the reproduction of the AM radio broadcast and the receiving of the radio-wave clock broadcast wave, and hence production costs can be reduced.

Furthermore, because in the market there are inexpensive IC chips that realize the receiver for the AM radio broadcast wave, by configuring the receiving circuit 1 of the present invention by use of such chips, the mechanism of the radio-wave clock can be realized inexpensively. Moreover, even where the receiving circuit is configured to have the only purpose of receiving the radio-wave clock broadcast wave without the receiving of the AM radio broadcast wave, the mechanism of the radio-wave clock can be realized at low cost by use of the above IC chips. Furthermore, these days, many of products such as radios, car audio and home audio systems have a microcomputer incorporated therein, and production costs can be further reduced by using the microcomputer to control the oscillator 15*b*.

The above description of the embodiment is provided to facilitate the understanding of the present invention and not intended to limit the present invention. It should be understood that various changes and alterations can be made therein without departing from spirit and scope of the invention and that the present invention includes its equivalents.

Figure 3:
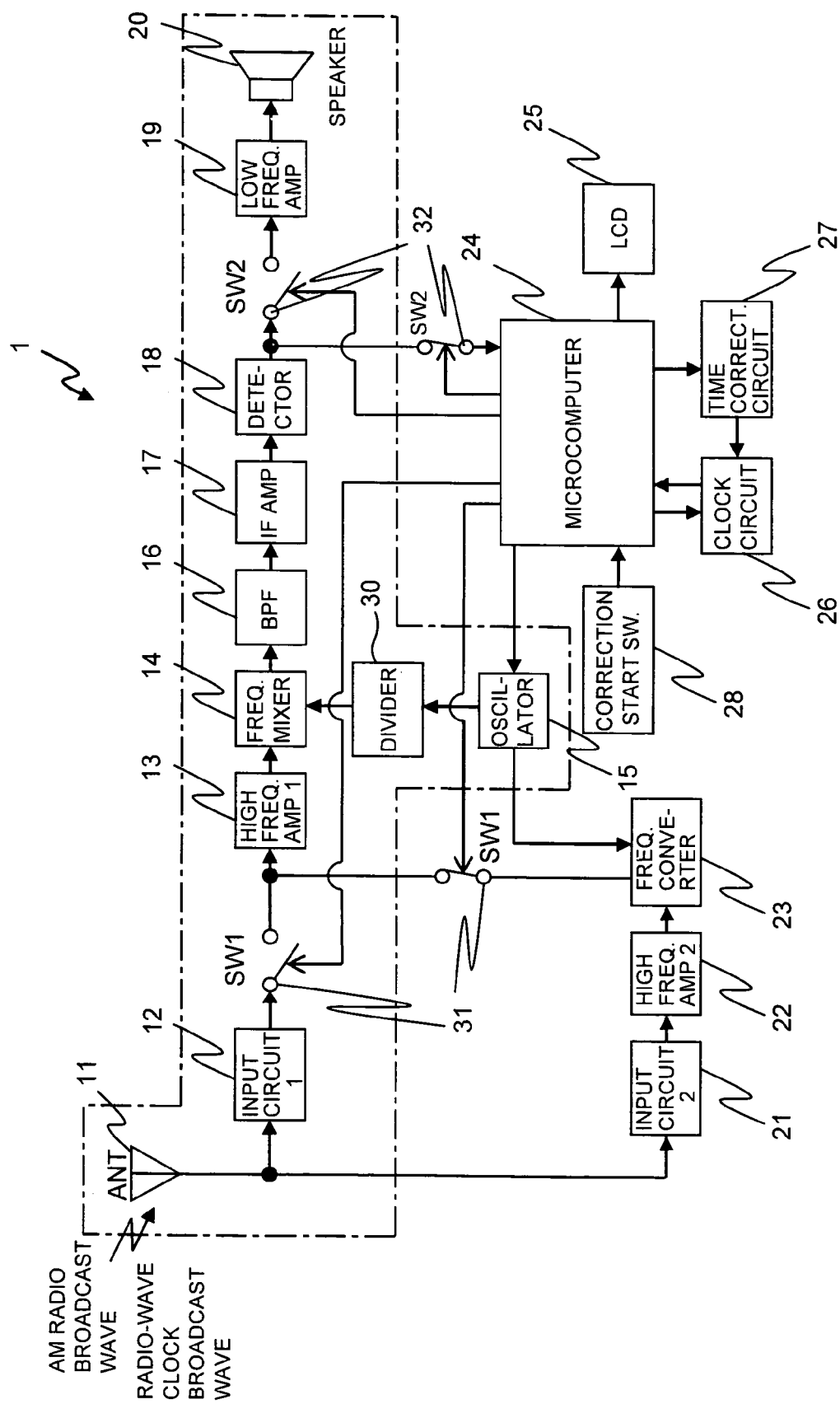
FIG. 3 is a diagram showing the block configuration of a receiving circuit 1 for the radio-wave clock broadcast wave using the receiver of the single super heterodyne type, described as an embodiment of the present invention, where oscillating signals of first and second frequencies are generated by one oscillator 15.

For example, the receiving circuit 1 described above has the configuration where the oscillator 15*b* generating the oscillating signal of the third frequency to be supplied to the frequency converter 23 is provided separate from the oscillator 15*a* generating the oscillating signal of the first frequency to be supplied to the frequency mixer 14, but may be configured to have one oscillator 15 generate the oscillating signals of the first and third frequencies. Moreover, the receiving circuit may be configured to receive the AM radio broadcast wave and the radio-wave clock broadcast wave with one antenna. FIG. 3 shows an example of such a configuration. The circuit of the Figure uses an oscillator 15 generating the oscillating signal of the third frequency and has a divider 30 that divides the third frequency to generate the first frequency. Further, the circuit is configured to receive the AM radio broadcast wave and the radio-wave clock broadcast wave with one antenna (ANT) 11 having a gain for both their bandwidths. With this configuration where the oscillator and the antenna are shared, production costs can be further reduced.

After the radio-wave clock broadcast wave starts to be received during the reproduction of the AM radio broadcast, the AM radio broadcast can not be reproduced until the time correction is completed. Accordingly, during the receiving of the radio-wave clock broadcast wave (in the second operating mode), the receiving circuit may notify the user through the image or audio output of a message "the radio-wave clock broadcast wave is being received" or through a display such as light emitting diodes (LEDs) so as to let the user know it.

If when preset time (e.g., 2 a.m.) is reached, the receiving circuit 1 is operating in the first operating mode, the microcomputer 24 may automatically switch from the first operating mode to the second operating mode to receive the radio-wave clock broadcast wave and correct the time of the clock circuit 26 (if the receiving circuit 1 is not operating in the first operating mode, the second operating mode automatically starts). In this case, when the time correction finishes, the microcomputer 24 may automatically switch the operation mode of the radio-wave clock broadcast wave receiving circuit 1 from the second operating mode to the first operating mode (if the radio-wave clock broadcast wave receiving circuit 1 was not originally operating in the first operating mode, the operation in the second operating mode is automatically stopped).

Figure 4:
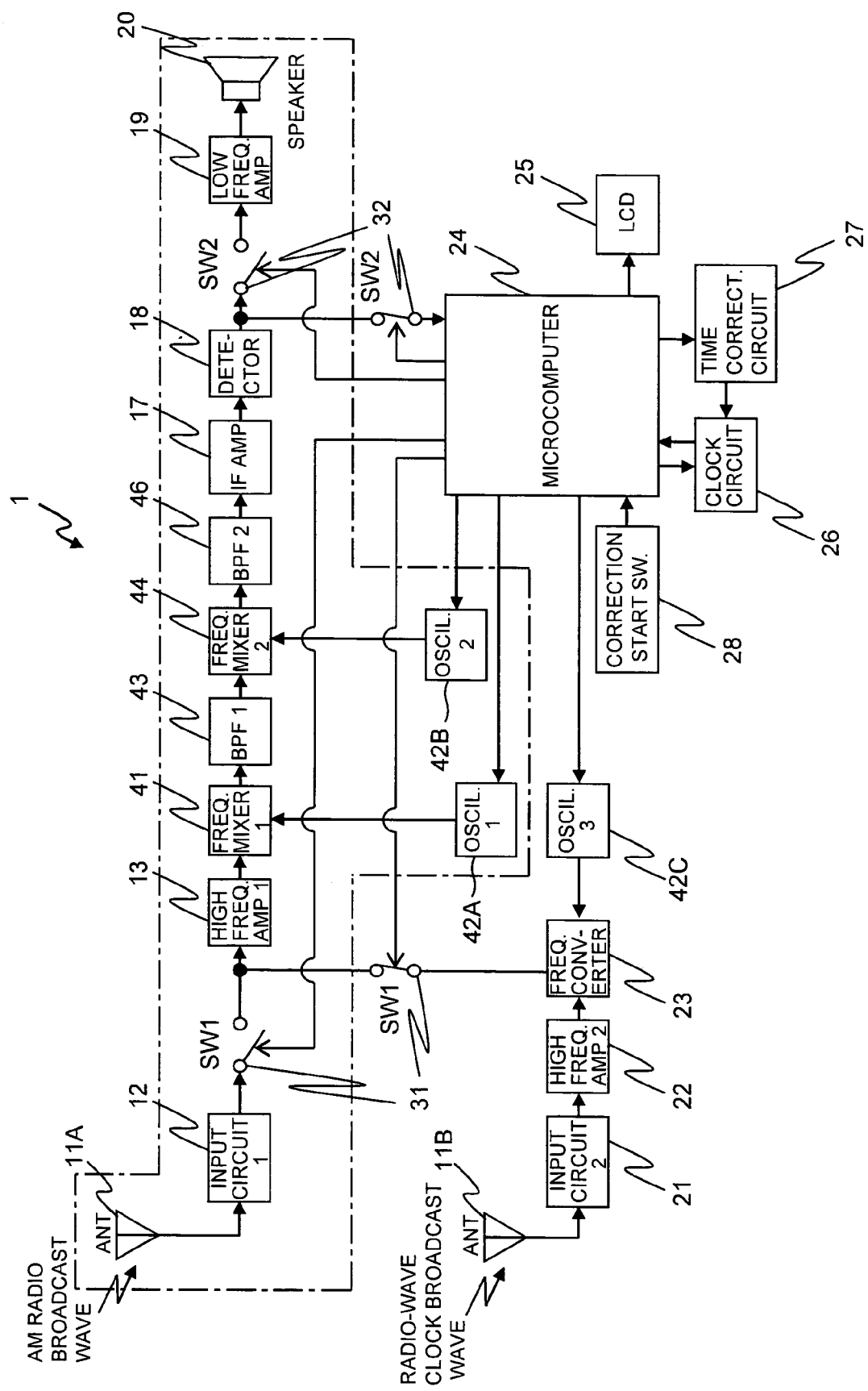
FIG. 4 is a diagram showing the block configuration of a receiving circuit 1 for the radio-wave clock broadcast wave using a receiver of a double super heterodyne type, described as an embodiment of the present invention.
Figure 5:
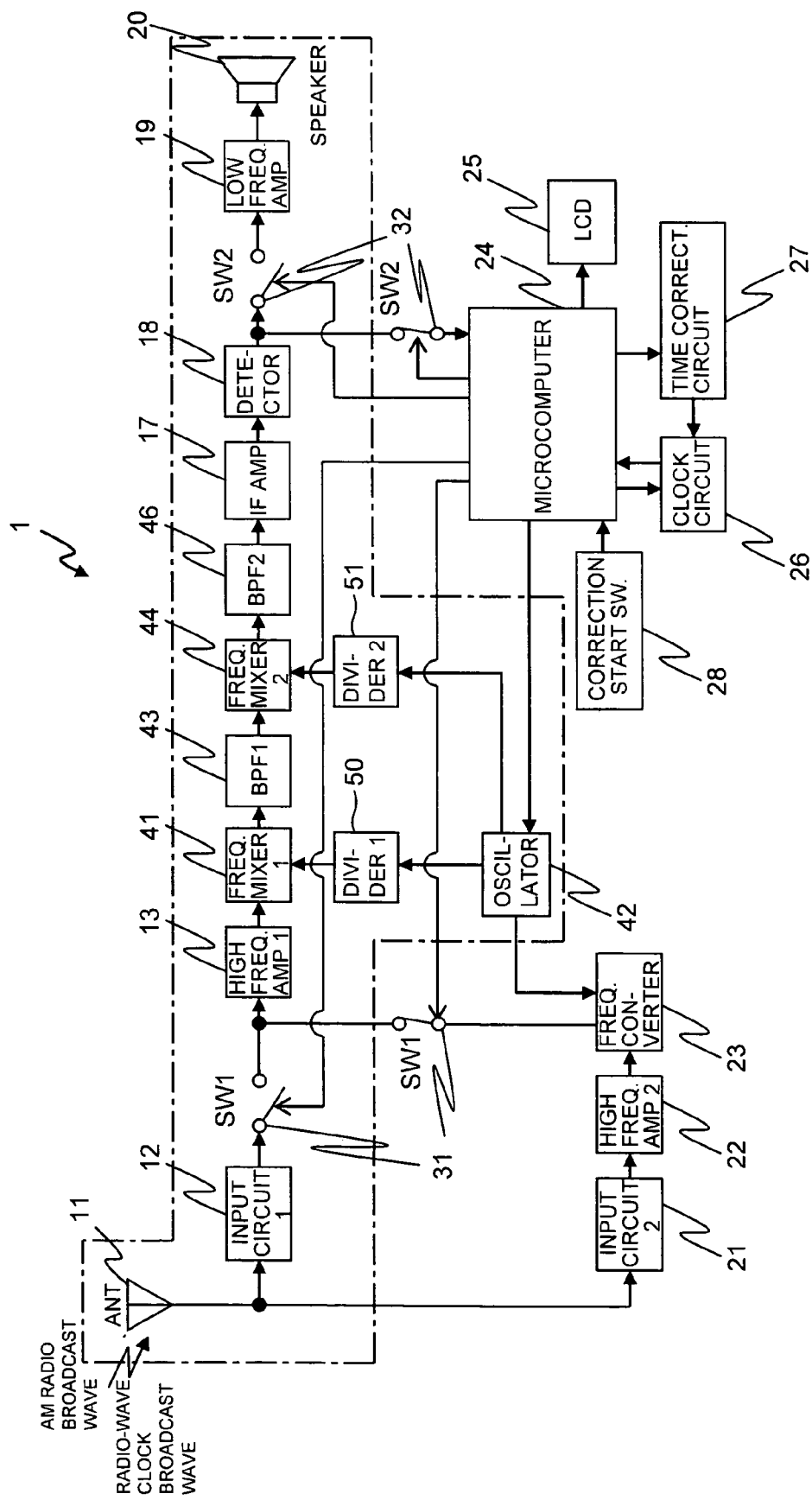
FIG. 5 is a diagram showing the block configuration of a receiving circuit 1 for the radio-wave clock broadcast wave using a receiver of the double super heterodyne type, described as an embodiment of the present invention, where oscillating signals of first to third frequencies are generated by one oscillator 42.

While the receiving circuit 1 described above is of the single super heterodyne type, the present invention can be applied to ones of a double super heterodyne type. FIG. 4 shows an example of a circuit of the double super heterodyne type having the present invention applied thereto. The circuit of the Figure comprises a first frequency mixer 41, a first oscillator 42*a* supplying the oscillating signal of the first frequency to this, and a first band pass filter 43 at the stage following the first frequency mixer 41, a second frequency mixer 44, a second oscillator 42*b* supplying an oscillating signal of a second frequency to this, a second band pass filter 46 at the stage following the second frequency mixer 44, a frequency converter 23, and a third oscillator 42*c* supplying the oscillating signal of the third frequency to this. Note that for the double super heterodyne type, either the first oscillator 42*a* or the second oscillator 42*b* may be made to generate the oscillating signal of the third frequency or that one oscillator may be made to generate all the first to third frequencies. FIG. 5 shows an example where one oscillator is made to generate all the first to third frequencies. In the circuit of the Figure, an oscillator 42 is used to generate the oscillating signal of the third frequency, and the first frequency is generated by a first divider 50 dividing the third frequency and the second frequency is generated by a second divider 51 dividing the third frequency. In FIG. 5, as in FIG. 3, the AM radio broadcast wave and the radio-wave clock broadcast wave are received with one antenna (ANT) 11 having a gain for both their bandwidths. With this configuration where the oscillator and the antenna are shared, production costs can be further reduced.

The oscillating signal of the third frequency needed by the frequency converter 23 is needed only during the operation in the second operating mode. Hence, for example, in the case of the single super heterodyne type, the microcomputer 24 may control the oscillator 15 to generate the oscillating signal of the third frequency only while operating in the second operating mode. In the case of the double super heterodyne type, the microcomputer 24 may control the first oscillator 42 or second oscillator 45 to generate the oscillating signal of the third frequency only while operating in the second operating mode. By this means, power consumption can be reduced.

What is claimed is:

1. A receiving circuit for a radio-wave clock broadcast wave comprising:
   a receiver for an AM radio broadcast wave which includes:
      a first high frequency amplifier that amplifies a received signal of the AM radio broadcast wave,
      an oscillator,
      a frequency mixer that mixes a signal output from the first high frequency amplifier with an oscillating signal of a first frequency generated by the oscillator thereby generating a signal of an intermediate frequency,
      an intermediate frequency amplifier that amplifies the signal of the intermediate frequency, and
      a detector that demodulates a signal output from the intermediate frequency amplifier;
   a second high frequency amplifier that amplifies a received signal of the radio-wave clock broadcast wave;
   a frequency converter that mixes a signal output from the second high frequency amplifier with an oscillating signal of a third frequency thereby converting into a signal of a frequency in a bandwidth of the AM radio broadcast wave; and
   a control circuit that makes the signal of the frequency in the AM radio broadcast wave bandwidth converted into by the frequency converter be input to the first high frequency amplifier and supplies a demodulated signal of the radio-wave clock broadcast wave that is output from the detector to a circuit performing time correction on the basis of the demodulated signal.

2. The receiving circuit for the radio-wave clock broadcast wave according to claim 1, wherein the oscillating signal of the third frequency is generated by the oscillator.

3. The receiving circuit for the radio-wave clock broadcast wave according to claim 1, wherein the oscillator is a PLL frequency synthesizer.

4. The receiving circuit for the radio-wave clock broadcast wave according to claim 1, wherein the control circuit controls the oscillator to generate the oscillating signal of the third frequency only during operation in the second operating mode.

5. The receiving circuit for the radio-wave clock broadcast wave according to claim 1, wherein the control circuit is configured to have a CPU, and the CPU supplies a demodulated signal of the radio-wave clock broadcast wave that is output from the detector to the circuit performing the time correction.

6. The receiving circuit for the radio-wave clock broadcast wave according to claim 1, further comprising:
   a single antenna that can receive both a signal of the AM radio broadcast wave and a signal of the radio-wave clock broadcast wave,
   wherein the received signal of the AM radio broadcast wave input to the first high frequency amplifier and the received signal of the radio-wave clock broadcast wave input to the second high frequency amplifier are the signals received by the antenna.

7. The receiving circuit for the radio-wave clock broadcast wave according to claim 1, wherein a band pass filter is connected between the frequency mixer and the intermediate frequency amplifier.

8. A receiving circuit for a radio-wave clock broadcast wave comprising:
   a receiver for an AM radio broadcast wave which includes:
      a first high frequency amplifier that amplifies a received signal of the AM radio broadcast wave,
      an oscillator,
      a frequency mixer that mixes a signal output from the first high frequency amplifier with an oscillating signal of a first frequency generated by the oscillator thereby generating a signal of an intermediate frequency,
      an intermediate frequency amplifier that amplifies the signal of the intermediate frequency, and
      a detector that demodulates a signal output from the intermediate frequency amplifier to produce a demodulated signal;
   a second high frequency amplifier that amplifies a received signal of the radio-wave clock broadcast wave;
   a frequency converter that mixes a signal output from the second high frequency amplifier with an oscillating signal of a third frequency thereby converting into a signal of a frequency in a bandwidth of the AM radio broadcast wave; and
   a control circuit that switches two operating modes that are a first operating mode where the received signal of the AM radio broadcast wave is input to the first high frequency amplifier and where the demodulated signal is output to a low frequency amplifier to reproduce the AM radio broadcast, and a second operating mode where the signal of the frequency in the AM radio broadcast bandwidth converted into by the frequency converter is input to the first high frequency amplifier and where a demodulated signal of the radio-wave clock broadcast wave that is output from the detector is supplied to a circuit performing time correction on the basis of the demodulated signal.

9. The receiving circuit for the radio-wave clock broadcast wave according to claim 8, wherein the oscillating signal of the third frequency is generated by the oscillator.

10. The receiving circuit for the radio-wave clock broadcast wave according to claim 8, wherein the oscillator is a PLL frequency synthesizer.

11. The receiving circuit for the radio-wave clock broadcast wave according to claim 8, wherein the control circuit switches from the second operating mode to the first operating mode when the time correction finishes.

12. The receiving circuit for the radio-wave clock broadcast wave according to claim 8, wherein the control circuit controls the oscillator to generate the oscillating signal of the third frequency only during operation in the second operating mode.

13. The receiving circuit for the radio-wave clock broadcast wave according to claim 8, wherein the control circuit is configured to have a CPU, and the CPU supplies a demodulated signal of the radio-wave clock broadcast wave that is output from the detector to the circuit performing the time correction.

14. The receiving circuit for the radio-wave clock broadcast wave according to claim 8, further comprising:
   a user interface through which a user instructs to start time correction,
   wherein the control circuit switches from the first operating mode to the second operating mode when instructed to start the time correction through the user interface.

15. The receiving circuit for the radio-wave clock broadcast wave according to claim 8, further comprising:

a single antenna that can receive both a signal of the AM radio broadcast wave and a signal of the radio-wave clock broadcast wave, wherein the received signal of the AM radio broadcast wave input to the first high frequency amplifier and the received signal of the radio-wave clock broadcast wave input to the second high frequency amplifier are the signals received by the antenna.

16. The receiving circuit for the radio-wave clock broadcast wave according to claim 8, wherein a band pass filter is connected between the frequency mixer and the intermediate frequency amplifier.

17. A receiving circuit for a radio-wave clock broadcast wave comprising:
   a receiver for an AM radio broadcast wave which includes:
      a first high frequency amplifier that amplifies a received signal of the AM radio broadcast wave,
      a first oscillator,
      a first frequency mixer that mixes a signal output from the first high frequency amplifier with an oscillating signal of a first frequency generated by the first oscillator thereby generating a signal of a first intermediate frequency,
      a second oscillator,
      a second frequency mixer that mixes the signal of the first intermediate frequency generated by the first frequency mixer with an oscillating signal of a second frequency generated by the second oscillator thereby generating a signal of a second intermediate frequency,
      an intermediate frequency amplifier that amplifies the signal of the second intermediate frequency, and
      a detector that demodulates a signal output from the intermediate frequency amplifier to produce a demodulated signal;
   a second high frequency amplifier that amplifies a received signal of the radio-wave clock broadcast wave;
   a frequency converter that mixes a signal output from the second high frequency amplifier with an oscillating signal of a third frequency thereby converting into a signal of a frequency in a bandwidth of the AM radio broadcast wave; and
   a control circuit that switches two operating modes that are a first operating mode where the received signal of the AM radio broadcast wave is input to the first high frequency amplifier and where the demodulated signal is output to a low frequency amplifier to reproduce the AM radio broadcast, and a second operating mode where the signal of the frequency in the AM radio broadcast bandwidth converted into by the frequency converter is input to the first high frequency amplifier and where a demodulated signal of the radio-wave clock broadcast wave that is output from the detector is supplied to a circuit performing time correction on the basis of the demodulated signal.

18. The receiving circuit for the radio-wave clock broadcast wave according to claim 17, wherein the oscillating signal of the third frequency is generated by the first oscillator or the second oscillator.

19. The receiving circuit for the radio-wave clock broadcast wave according to claim 17, wherein the first oscillator or the second oscillator is a PLL frequency synthesizer.

20. The receiving circuit for the radio-wave clock broadcast wave according to claim 17, wherein the control circuit switches from the second operating mode to the first operating mode when the time correction finishes.

21. The receiving circuit for the radio-wave clock broadcast wave according to claim 17, wherein the control circuit controls the first oscillator or the second oscillator to generate the oscillating signal of the third frequency only during operation in the second operating mode.

22. The receiving circuit for the radio-wave clock broadcast wave according to claim 17, wherein the control circuit is configured to have a CPU, and the CPU supplies a demodulated signal of the radio-wave clock broadcast wave that is output from the detector to the circuit performing the time correction.

23. The receiving circuit for the radio-wave clock broadcast wave according to claim 17, further comprising:
   a user interface through which a user instructs to start time correction,
   wherein the control circuit switches from the first operating mode to the second operating mode when instructed to start the time correction through the user interface.

24. The receiving circuit for the radio-wave clock broadcast wave according to claim 17, further comprising:
   a single antenna that can receive both a signal of the AM radio broadcast wave and a signal of the radio-wave clock broadcast wave,
   wherein the received signal of the AM radio broadcast wave input to the first high frequency amplifier and the received signal of the radio-wave clock broadcast wave input to the second high frequency amplifier are the signals received by the antenna.

25. The receiving circuit for the radio-wave clock broadcast wave according to claim 17, wherein a first band pass filter is connected between the first frequency mixer and the second frequency mixer and a second band pass filter is connected between the second frequency mixer and the intermediate frequency amplifier.

* * * * *